Patented Dec. 16, 1924.

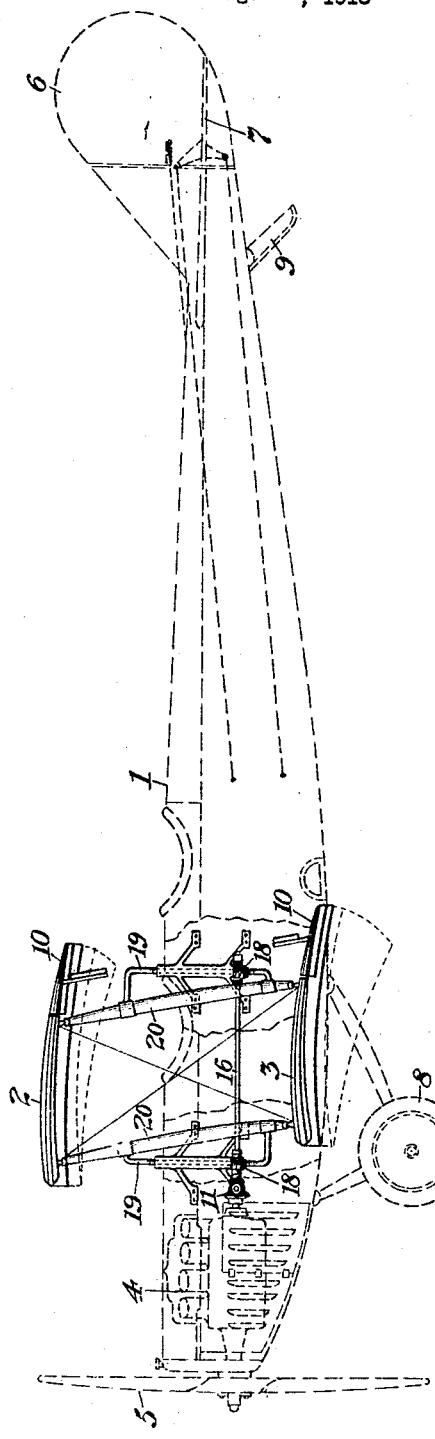

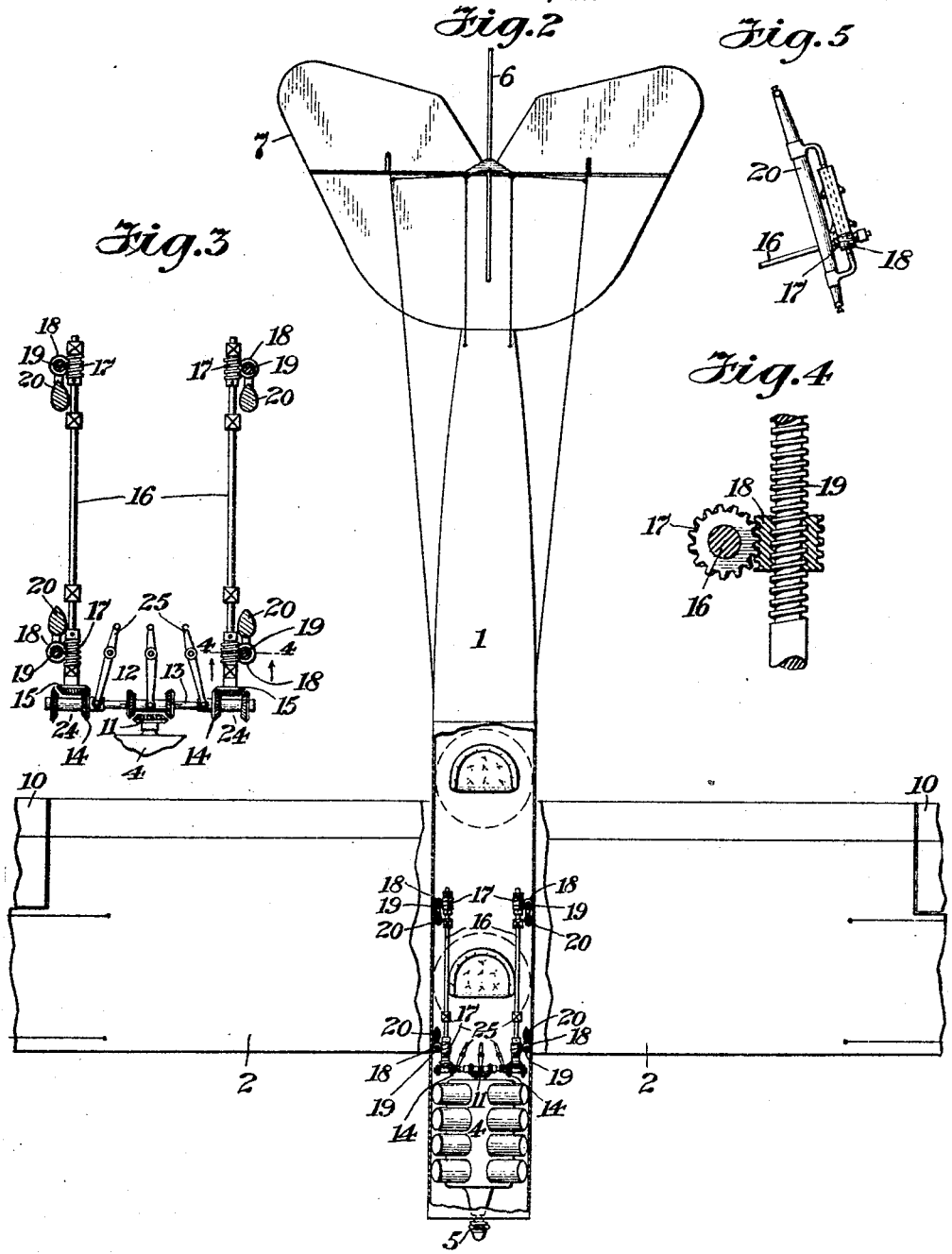

1,519,618

UNITED STATES PATENT OFFICE.

JOHN W. S. HODGDON, OF KITTERY POINT, MAINE.

AIRPLANE.

Application filed August 14, 1918. Serial No. 249,800.

*To all whom it may concern:*

Be it known that I, JOHN W. S. HODGDON, a citizen of the United States, residing at Kittery Point, in the county of York and State of Maine, have invented certain new and useful Improvements in Airplanes, of which the following is a specification.

My invention relates generally to airplanes and particularly relates to improved means for utilizing the main planes in the control of the machine.

It has been heretofore recognized in the airplane art that it would be immensely advantageous if provisions could be made for varying the angle of incidence of the main planes of a machine during flight in order to best adapt the machine at the will of the operator for either climbing or high speed operations, and to attain a flexibility and range of manipulation that can be approached in only a limited degree with the controlling mechanism ordinarily used. In the attempts that have been made to devise mechanism for varying the angle of incidence of the main planes, the designers have invariably lost sight of the necessity for providing special means for automatically adjusting conditions of balance in strict compliance with the radical disruption of such conditions that inherently tend to follow any manipulation of the plane areas as a whole. The result has been that reliance has been placed solely in the use of the ordinary stabilizer for maintaining equilibrium, but it is obvious that the horizontal area presented by such stabilizing planes is wholly inadequate to counteract the unbalancing influence exerted by the enormously greater area presented by the main planes, so that, unless some special corrective means are provided, a variation of the angle of incidence of the main planes during flight is likely to have disastrous results.

The principal object of this invention is to provide means for changing the angle of incidence of the main planes of an airplane without destroying the equilibrium of the machine and interfering with the operator's control thereof.

With this and other objects in view, the principal feature of the invention resides in the provision of means for bodily shifting the planes of an airplane vertically with relation to a normal position of the fuselage, and in proportion to the degree of inclination given the planes in varying their angle of incidence.

At the normal angle of incidence of the main planes of an airplane the center of the upward air pressure against the plane is slightly to the rear of the center of gravity of the machine as a whole, so that the airplane tends to automatically tilt forwardly at the proper angle for making a landing glide at the requisite speed to overcome the danger of side slipping. Two other forces which must be taken into consideration may, for convenience, be designated as the thrust, or the forward pull of the propeller, and the opposing drift, or head resistance. The centers of these two substantially horizontally acting opposing forces are practically coincident in the best designed machines. It will be obvious that a very slight variation in the angle of incidence of the main planes is sufficient to move the center of upward pressure either backward or forward with relation to the center of gravity, and also to very substantially move the center of drift upwardly or downwardly with relation to the center of thrust, so that pronounced turning moments about a transverse horizontal axis are created which produce a decided unstabilizing effect that can be only partially corrected by the manipulation of the ordinary rear stabilizing plane. At the same time the enhanced degree of control that is obtainable through the ability to vary the angle of incidence of the main planes while flying makes it very desirable that means for obtaining such results be provided. I have found that the provision of means for producing a bodily movement of the entire main plane structure upward or downward with relation to the fuselage, and in proportion to the variation produced in the angle of incidence of the main planes, will overcome the unstabilizing effect referred to and put into the hands of the operator a power of control far surpassing that available in airplanes heretofore known and used.

In the drawing a preferred embodiment of the invention is disclosed for illustrative purposes, it being understood that many different embodiments of the invention may be utilized for performing the desired function.

Figure 1 is a side view in elevation of an airplane equipped with devices embodying a preferred form of the invention.

Figure 2 is a plan view, partly broken away, of the airplane shown in Figure 1.

Figure 3 is an enlarged view in detail of the controlling mechanism used in connection with the device.

Figure 4 is an enlarged sectional view showing one of the sets of elevating devices.

Figure 5 is a view showing a modified form of means for guiding the movement of the main planes.

In Figure 1 of the drawing there is shown an airplane of the two-seated type showing standard form of fuselage 1, upper wings or main planes 2, lower planes 3, motor 4, propeller 5, vertical rudder 6, and rear stabilizing plane 7. Any suitable landing gear, such as the wheels 8 and the skid 9, may be provided, and ailerons 10 of the type shown or of any other desired type may be utilized without modifying the invention which is self-contained and applicable to any existing type of machine.

In order to provide for varying the angle of incidence of the main planes 2 and 3, and also for bodily moving the planes with relation to the fuselage 1, the controlling mechanism shown in Figure 3 of the drawing is provided. In this mechanism a bevel gear 11 fast on the rearmost end of the propeller shaft or any other suitable motor-driven shaft, is utilized through the counter shaft 13 and bevel gears 14 and 15 to the driving shafts 16 from which the main plane controlling devices are driven. These devices consist of worm gears 17 and spiral toothed gears 18 meshing with and driven from the worm gears 17. The spiral toothed gears 18 are internally threaded for engagement with the threaded supporting rods 19 which are rigidly attached to the vertical struts 20 connected through ball and socket joints with the framework of the upper and lower planes 2 and 3. The vertical struts 20 which form the central group contiguous to the lateral walls of the fuselage, may be made of spruce in the usual manner or of steel or other material having a high degree of strength, as may be found desirable. The operating rods 19 are slidably mounted in fixed sleeves 21 rigidly connected to the framework of the fuselage 1 through the supporting brackets 22, and which act as guides for the rods 19 in an obvious manner.

In the operation of the controlling devices just described, if it is desired for instance to increase the angle of incidence of the main planes 2 and 3 in order to climb rapidly, the clutch 12 is operated to cause either one of the bevel gears 23, depending upon the direction of rotation of the motor shaft, to slide along the splined counter shaft 13 into engagement with the driving gear 11. This connection will obviously cause the counter shaft 13 and the bevel gears 14 carried thereby to rotate so that the drive shafts 16 are in their turn set into rotation. The shafts 16, through the worm gears 17, will produce a downward movement of the threaded rods 19 and a corresponding downward movement of the main planes 2 and 3. In order to increase the angle of incidence of the main planes, the rearmost edges of the planes are moved downward more rapidly than the front edges through the use of different gear ratios in the front and the rear worm driving gears 17. It will be seen, therefore, that as an increasing angle of incidence is produced in the planes, that the planes are at the same time moved downward bodily. In airplanes of standard types the center of gravity of the machines is adjacent the level of the lower planes. Hence it will be seen that the head resistance of the upper planes is at a greater distance from the center of gravity than is the position of the corresponding resisting surface offered by the lower planes. Consequently an increase in the resistance offered by both upper and lower planes produces a considerable leverage tending to turn the machine over backward. By bodily moving the main planes downward a distance directly proportional to the change in the angle of incidence, the unstabilizing effect of increasing the angle of incidence is corrected, since the center of drift or head resistance is thereby maintained substantially in the same position with relation to the center of gravity and the balance of the machine maintained.

The operator can accordingly greatly increase the climbing capacity of this machine or, if desired, he can decrease the angle of incidence of the main planes to a much smaller degree than normal and increase the horizontal speed of flight of the machine to a greatly increased extent.

It will be noted in Figure 1 of the drawing that the main planes are vertically moved in lines substantially perpendicular to the longitudinal axis of the machine and that this form of the invention, while not compensating for variations in the relation of the centers of gravity and lift, will nevertheless provide an ample balancing effect for machines of the type shown in which wing areas of considerable size are employed. However, in machines of the fast, scouting type having comparatively small wing areas, it is preferred to compensate for the gravity-lift as well as the thrust-drift factors, and this is effected by providing for the bodily movement of the main planes, not only downward, but somewhat to the rear by causing the wings to move substantially parallel with the axes of the vertical wing supporting struts, as indicated in Figure 5 of the drawing. This will obviously correct the tendency that increasing the angle of incidence would have to move the center of lift forward of the center of gravity and produce an unstabilizing force.

In order to provide also for moving the wings at one side of the machine downwardly while the wings at the other side are moved upwardly in order to accomplish swift lateral turns or to retain lateral balance under conditions tending to disturb the same, supplemental reversing clutches 24 at the ends of the shaft 13 and controlled by the handles 25 are provided, by means of which either lateral wing structure may have its direction of vertical movement reversed with relation to the direction of movement of the wing structure on the opposite side of the machine. The operating handles 25 and 12 may be mounted in any convenient location such as on the steering wheel or alongside the driver's seat, as desired.

It will be seen that by the mechanism described I have provided means for changing the angle of incidence of the main planes of a machine during flight and automatically correcting the tendency that this operation has to destroy conditions of balance, whereby the operator has the power to greatly increase the horizontal speed of his machine at the expense of his climbing ability, or on the other hand, to decrease his power to fly at a great speed forward in order to climb rapidly. This greatly increases the flexibility of manipulation of any given machine and makes it possible to adapt the same machine for fast dodging or manoeuvering or rapid flight as conditions may require. It is obvious that the ability to apply substantially all the power of the engine to lifting the machine from the ground, and then when the machine is in the air, decreasing the angle of incidence of the main planes to exert the engine pull in speed of flight, has the effect of greatly enhancing the efficiency of the motor, or in other words, of accomplishing much results without a corresponding increase in the horse power of the motor.

While throughout the case the term "airplane" has been used in describing the invention, it is to be understood that this term is used in an illustrative sense only, and that the invention is applicable to any flying machine for land or sea use in which planes or wings play any part in sustaining the weight of the machine during flight, and to monoplanes, triplanes, or other machines having various numbers of wings or sets of wings.

Having thus described my invention, what I claim and desire to secure by Letters Patent of the United States is:

1. In a flying machine having a fuselage and a plurality of normally substantially horizontal weight-sustaining planes, supporting strut members connecting forward portions of the planes and mounted for substantially vertical movement on said fuselage, supporting strut members connecting rear portions of the planes and mounted for substantially vertical movement on said fuselage, interconnected means for moving said strut members to thereby bodily move the planes, said means for moving said strut members being constructed to move the rear strut members to a greater extent than the forward strut members, whereby as the planes are bodily moved with relation to the fuselage, the angle of incidence thereof is changed.

2. In a flying machine having a weight sustaining substantially horizontal plane, means adapted to be driven from the motor for raising or lowering the forward portion of the plane and for raising or lowering the rearmost portion of the plane to a greater extent, means under control of the operator for establishing driving connections between the motor and the plane moving means, and means for reversing the direction of movement of the driving means for the plane at one side of the machine.

3. In a flying machine, a plurality of planes extending in opposite directions from the sides of the machine, said planes being adapted to be turned about their forward edges during flight to change the angle of incidence of the planes, and means for turning one of the said planes independently of the other plane and for simultaneously bodily moving the plane upwardly or downwardly to thereby compensate for the change in the angle of incidence of the plane.

Signed at Newark in the county of Essex in the State of New Jersey, this 8th day of August, 1918.

JOHN W. S. HODGDON.